US012722648B2

(12) United States Patent
Alexander

(10) Patent No.: US 12,722,648 B2
(45) Date of Patent: Sep. 1, 2026

(54) SAFE OPERATION OF VEHICLE CONTROLLERS

(71) Applicant: Applied Electric Vehicles Ltd, Scoresby (AU)

(72) Inventor: Marc Alexander, Croydon Hills (AU)

(73) Assignee: Applied Electric Vehicles Ltd, Scoresby (AU)

( * ) Notice: Subject to any disclaimer, the term of this patent is extended or adjusted under 35 U.S.C. 154(b) by 191 days.

(21) Appl. No.: 18/608,397

(22) Filed: Mar. 18, 2024

(65) Prior Publication Data

US 2025/0289444 A1 Sep. 18, 2025

(51) Int. Cl.
*B60W 50/029* (2012.01)
*B60W 50/02* (2012.01)

(52) U.S. Cl.
CPC ...... *B60W 50/029* (2013.01); *B60W 50/0205* (2013.01); *B60W 2050/0292* (2013.01); *B60W 2530/00* (2013.01)

(58) Field of Classification Search
CPC ........... B60W 50/029; B60W 50/0205; B60W 2050/0292; B60W 2530/00; B60W 50/023; B60W 50/04; G06F 11/0772; G06F 11/0796; G06F 11/2035; G06F 11/2048; G06F 11/3013; G06F 11/3024; G06F 11/0739
See application file for complete search history.

(56) References Cited

U.S. PATENT DOCUMENTS

2007/0288204 A1* 12/2007 Gienke .............. G05B 19/0428 702/188
2018/0370540 A1* 12/2018 Yousuf ................ B60W 50/045
2019/0041837 A1* 2/2019 Elenich .............. G05B 23/0251
2019/0066399 A1 2/2019 Jiang et al.
2019/0258251 A1* 8/2019 Ditty ................... G06F 15/7807
2021/0301734 A1* 9/2021 Hart .................... G06F 11/0739
2021/0394770 A1 12/2021 Rocha et al.
2022/0048525 A1* 2/2022 Tsai ........................ G06F 11/22
2025/0289443 A1* 9/2025 Alexander .......... G06F 11/0739

FOREIGN PATENT DOCUMENTS

WO 2014158667 A1 10/2014
WO 2025199022 A1 9/2025

OTHER PUBLICATIONS

Gupta, et al., "Mission Management Computer and Sequencing Hardware for RLV-TD HEX-01 Mission", Journal of the Institution of Engineers (India), vol. 98, No. 6., Oct. 20, 017, 5 pages.
"International Search Report and Written Opinion", International Application No. PCT/US25/20216, Jul. 10, 2025, 14 pages.

* cited by examiner

*Primary Examiner* — Jason Holloway
*Assistant Examiner* — Madison B Emmett
(74) *Attorney, Agent, or Firm* — FIG. 1 Patents

(57) ABSTRACT

Safe operation of vehicle controllers is described. In one or more implementations, a system includes a vehicle network, a plurality of edge devices in communication with the vehicle network and operable to implement vehicle operations, and a vehicle control system in communication with the vehicle network and having at least two processors configured to redundantly control the vehicle operations implemented by the edge devices. Each of the processors is operable to self-report a respective processor health to the vehicle network for enabling each edge device to independently arbitrate to be controlled by a healthiest processor.

20 Claims, 5 Drawing Sheets

SAFE OPERATION OF VEHICLE CONTROLLERS

BACKGROUND

Modern vehicle architectures include various electronic systems that facilitate driving. However, these systems are susceptible to faults and errors, which can significantly impact vehicle performance. Safeguarding against such issues to ensure vehicle and pedestrian safety is important. Redundancy is one way to enhance reliability of an electronic vehicle system and maintain vehicle functionality during a malfunction. When a primary system fails, a redundant system takes over to allow a vehicle to gracefully maneuver to a safe state.

DETAILED DESCRIPTION

Figure 1:
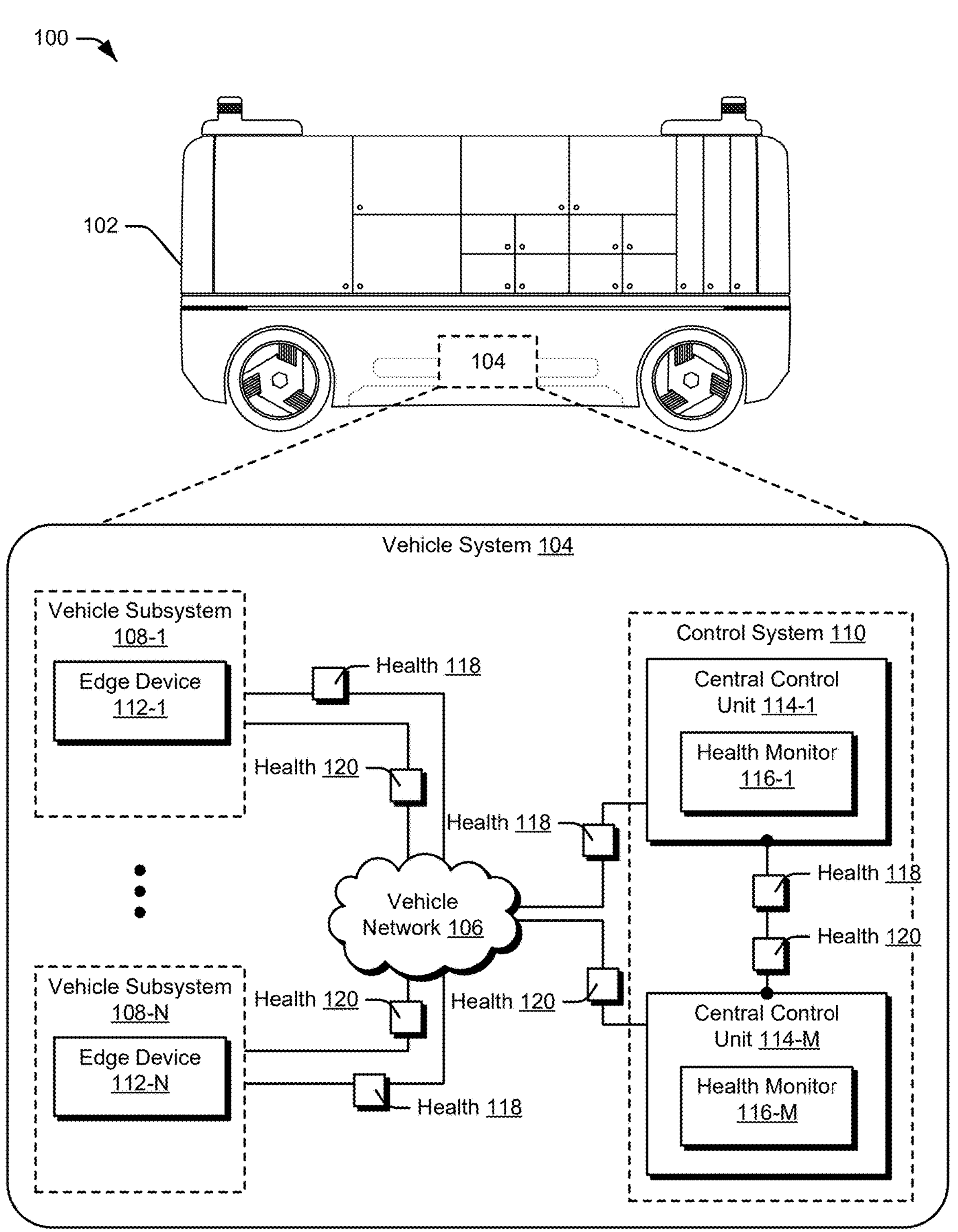
FIG. 1 is a block diagram of a non-limiting example environment including a vehicle having a vehicle system that implements safe operation of vehicle controllers.

Modern vehicle architectures include many types of electronic systems that facilitate driving, vehicle safety, and user experiences. For example, a vehicle includes multiple electronic control units (ECUs) or controllers, which are distributed about a vehicle chassis to control different parts of the vehicle. A braking system, a propulsion system, a steering system, and a safety system are but a few example systems on a vehicle, which are independently controlled by different ECUs.

As with other types of electronic systems, vehicle systems such as these are susceptible to faults and errors, which can significantly impact vehicle performance. For example, a vehicle with a malfunctioning controller of a propulsion system is prevented from safely accelerating or decelerating with changing traffic conditions. An inoperable steering or braking system controller inhibits a vehicle ability to perform defensive driving maneuvers, which risks pedestrian and vehicle safety.

Some vehicle faults and errors occur when hardware is damaged or rendered inoperable (e.g., due to harsh driving conditions, because of an impact or collision). In other instances, software glitches cause electronic systems to malfunction. Safeguarding against such electronic hardware and software issues helps promote vehicle and pedestrian safety. In some jurisdictions, vehicle safeguards are mandated by traffic laws. For example, these traffic laws reference various safety standards that vehicles adopt to reduce risk and promote safety of occupants, other vehicles, and pedestrians.

The international organization of standardization (ISO) publishes the ISO standard 26262 titled "Road vehicles-Functional Safety." This standard defines a set of functional safety requirements of different electrical and electronics systems in a vehicle. In some jurisdictions, adherence to this standard is a condition for allowing a vehicle to operate on a road. The standard assigns an Automotive Safety Integrity Level (ASIL) to each part or function of a vehicle. There are four different ASILs including ASIL-A, which is assigned to vehicle functions and parts that present a lowest risk to safety, and ASIL-D, which is assigned to vehicle functions and parts that present a highest safety risk. ASIL-D is used for vehicle components involved in high exposure driving situations where malfunctions cause vehicles to be most difficult to control, which can lead to death or major bodily harm.

Redundancy is one way to enhance reliability of an electronic vehicle system to satisfy ASIL-D and other requirements for vehicle safety. For example, a vehicle includes redundant copies of an electronic system. In operation, one of the systems (e.g., a primary system) is active and controls an aspect of the vehicle while the other system (e.g., a backup system) remains inactive until the primary system fails. If the active system fails, the redundant system is activated to control the aspect of the vehicle previously controlled by the primary system.

A challenge of modern vehicle architectures is in implementing a takeover procedure that quickly switches between two redundant systems when one fails, and which is seamless and does not elevate risk of danger. For example, when a vehicle is moving with traffic, the vehicle has a narrow safety envelope to switch from a primary to a backup system. If a backup system does not engage quickly enough (e.g., within a few milliseconds) there is a high likelihood that the vehicle drives out of control and collides with another vehicle, building, infrastructure, or pedestrian.

In at least one conventional redundant architecture, when a primary system fails and a backup system is set to takeover vehicle control, the takeover procedure is implemented by a separate logic unit (e.g., a third system). For example, a control system relies on a fault detection unit operable to deactivate a primary system and disable control outputs derived from the primary system. The fault detection unit causes an execution path through the control system to deviate from the primary system and instead be managed by the backup system. In at least one other conventional vehicle control system, the takeover procedure is initiated by manual (e.g., driver inputs). For example, when a fault with the primary system is detected, the driver provides input to a vehicle user interface to cause the switch to the backup system (e.g., by toggling a selector, by confirming a vehicle recommendation to approve the switch). In these and other conventional cases, the control system itself arbitrates decisions to rely on backup systems. If this arbitration fails at the same time a primary control system performance deteriorates, vehicle subsystems are allowed to be controlled by control commands issued by a faulty system.

In accordance with techniques of this disclosure, safe operation of vehicle controllers is described. A redundant vehicle control system has multiple control units (e.g., processors) each operable to independently manage and control subsystems (e.g., edge devices) of a vehicle. These parallel central control units operate in macro-lockstep, each executing as a continuously operating unit with executive control of the complete system. Each of the control units executes a same (or functionally similar) control routine in parallel with the other control units. The parallel execution of separate control units configures the vehicle control system to output multiple (e.g., redundant) sets of control commands and signals. If one of the control units fails, commands and signals from another control unit are still available to the vehicle subsystems to control the vehicle.

Unlike a conventional vehicle architecture that relies on a system level arbitrator (e.g., decisions made by individual control units, decisions made by a separate logic within the control system) to cause a switch from one set of control commands to another set of control commands during a failure, the vehicle subsystems (e.g., the edge devices) themselves are arbitrators. Each of the vehicle subsystems is operable to determine whether to use commands from one of the available control units or another based on health scores being self-reported by the different control units.

For example, each of the control units executes a system-level health monitor to determine a health of its view of the vehicle subsystems including a self-reported health of that control unit. The health monitor identifies potential failures in the vehicle and receives the self-reported health of counterpart control units to generate its overall health report of the vehicle (e.g., a health score). The control units each output a respective health score to a vehicle network as an indication of the overall health associated with the vehicle control system and the vehicle subsystems. With multiple health scores being distributed throughout the vehicle, the edge devices on the vehicle network make the controlling selection automatically based on the self-reported health scores. The vehicle subsystems automatically use commands and signals that are received from a healthiest control unit (e.g., a control unit with a highest self-reported health score).

With control unit arbitration being performed on the edge devices of the vehicle subsystems themselves, there is less likelihood of a vehicle continuing to be controlled by a faulty control unit. An unhealthy control unit is quickly identifiable on the vehicle network, without waiting for a central arbitrator to detect a failure condition and/or engage control unit switch-over. This distribution of system health and ability of individual vehicle subsystems to maintain safety of their own functions helps ensure vehicle subsystems operate according to correct and safe commands and signals because a control system arbitrator is no longer a single point of failure. This way, if one of the control units fails, commands and signals from another control unit are still available to the vehicle subsystems to control the vehicle seamlessly and continuously through a failure, in furtherance of satisfying safety rules (e.g., ASIL-D). Although the ISO standard 26262 and the ASIL-D classification are discussed throughout this disclosure by way of example, it is to be appreciated that any vehicle safety standard or combination of safety standards may be adhered to in performing safe operation of vehicle controllers in accordance with the described techniques.

In some aspects, the techniques described herein relate to a system including: a vehicle network, a plurality of edge devices in communication with the vehicle network and operable to implement vehicle operations, and a vehicle control system in communication with the vehicle network and having at least two processors configured to redundantly control the vehicle operations implemented by the edge devices, each of the processors being operable to self-report a respective processor health to the vehicle network for enabling each edge device to independently arbitrate to be controlled by a healthiest processor.

In some aspects, the techniques described herein relate to a system, wherein each of the processors is operable to concurrently receive a same set of inputs from the edge devices and concurrently send a same set of outputs to the edge devices.

In some aspects, the techniques described herein relate to a system, wherein each of the processors is operable to concurrently receive the same set of inputs and concurrently send the same set of outputs regardless of whether that processor is the healthiest processor.

In some aspects, the techniques described herein relate to a system, wherein each of the processors is operable to concurrently exchange a same set of inputs and outputs with the edge devices over respective channels of the vehicle network that link the edge devices to that processor.

In some aspects, the techniques described herein relate to a system, wherein the processors are operable to interleave a same set of inputs and outputs concurrently exchanged with the edge devices over a same set of channels of the vehicle network.

In some aspects, the techniques described herein relate to a system, wherein each of the processors is operable to self-report the respective processor health of that processor to each other processor of the vehicle control system for controlling the vehicle operations.

In some aspects, the techniques described herein relate to a system, further including: a processor side channel configured to communicate the respective processor health being self-reported by each of the processors to each other processor of the vehicle control system.

In some aspects, the techniques described herein relate to a system, wherein the processor side channel is separate from the vehicle network.

In some aspects, the techniques described herein relate to a system, wherein each of the processors is operable to concurrently receive a respected device health being self-reported by each of the edge devices for independently controlling one or more of the vehicle operations implemented by that edge device.

In some aspects, the techniques described herein relate to a system, wherein each of the processors is operable to disable at least one of the edge devices based on the respective device health being self-reported by the at least one of the edge devices.

In some aspects, the techniques described herein relate to a system, wherein the respective processor health being self-reported by each of the processors includes a respective system health determined by that processor for further enabling each edge device to independently determine the healthiest processor.

In some aspects, the techniques described herein relate to a vehicle control system including: at least two processors configured to redundantly control vehicle operations by communicating over a vehicle network to independently manage a same group of edge devices that implement the vehicle operations, each of the processors being operable to self-report a respective processor health to the vehicle network for enabling each edge device to independently arbitrate to be managed by a healthiest processor.

In some aspects, the techniques described herein relate to a vehicle control system, wherein each of the processors is operable to concurrently determine a presence of one or more faults attributed to the edge devices and determine the respective processor health of that processor based on the presence of the faults.

In some aspects, the techniques described herein relate to a vehicle control system, wherein each of the processors is operable to concurrently attempt to mitigate the faults and determine the respective processor health of that processor based on whether the faults are mitigated.

In some aspects, the techniques described herein relate to a vehicle control system, wherein each of the processors is operable to: self-report the respective processor health of that processor to each other processor of the vehicle control system for controlling the vehicle operations, and initiate a safe termination of the vehicle operations in response to determining the respective processor health being self-reported by at least one of the processors does not satisfy a safety threshold.

In some aspects, the techniques described herein relate to a vehicle control system, wherein each of the processors is operable to concurrently control power distributed to the edge devices over respective connections between the edge devices and that processor.

In some aspects, the techniques described herein relate to a vehicle control system, wherein each of the processors is operable to self-report the respective processor health to the vehicle network for enabling each edge device to independently arbitrate to be managed by the healthiest processor.

In some aspects, the techniques described herein relate to a computer-readable storage medium including instructions that, when executed, cause a vehicle control system to redundantly control vehicle operations by independently managing a group of vehicle edge devices using at least two processors, each of the processors being operable to: receive edge device information from the edge devices, receive processor information from the processors, determine a respective processor health based on the edge device information and the processor information, and output, to the edge devices, the respective processor health for enabling each edge device to independently arbitrate to be managed by a healthiest processor of the vehicle control system.

In some aspects, the techniques described herein relate to a computer-readable storage medium, wherein the computer-readable storage medium is installed in a vehicle.

In some aspects, the techniques described herein relate to a computer-readable storage medium, wherein the computer-readable storage medium is installed in a vehicle control system of the vehicle.

FIG. 1 is a block diagram of a non-limiting example environment 100 including a vehicle having a vehicle system that implements safe operation of vehicle controllers. The environment 100 includes any type of vehicle operating environment, such as a roadway, a traffic scenario, an off road area (e.g., a construction site, a mining operation, a recreational area), in the air, on or in the water, on or in other substances (e.g., within fluids and/or cellular material), in space, and other public or private spaces, to name a few. The environment 100 includes a vehicle 102, which may be any type of vehicle including ground vehicles (e.g., trucks, cars, vans, tractor-trailers, tanks), air vehicles, rail vehicles, marine vehicles, space vehicles, or other vehicle types. The vehicle 102 in at least one example is unmanned (e.g., autonomously controlled, remotely controlled), and in at least one other example the vehicle 102 is manned (e.g., semi-autonomously controlled, at least partially human operated).

The vehicle 102 includes a vehicle system 104. The vehicle system 104 generally includes multiple electronic systems configured to interface with electro-mechanical components of the vehicle 102 to implement processor-based vehicle functions and processor-driven operations, such as for driving or maneuvering the vehicle 102 in the environment 100.

The vehicle system 104 includes a vehicle network 106 that operatively couples a plurality of vehicle subsystems 108 to a control system 110. For example, the vehicle subsystems 108 represent a plurality of edge devices on the vehicle 102, which are in communication with the vehicle network 106 and the control system 110 to control vehicle components that operate in coordination to execute vehicle operations based on the network communication.

Examples of the vehicle subsystems 108 include but are not limited to a propulsion or motion subsystem (e.g., providing motion control), a drive subsystem (e.g., providing autonomous or semi-autonomous motion control), a transmission subsystem, a powertrain subsystem, a human machine interface (HMI) subsystem (e.g., for receiving driver input, for receiving occupant input, for controlling in-vehicle infotainment), a remote entry or remote start subsystem, a braking subsystem (e.g., providing brake control), an electronic stability control (ECM) subsystem, and a communication subsystem for handling on-board and/or offboard communications (e.g., data and telemetry, vehicle-to-vehicle, vehicle-to-everything, cellular, Bluetooth), to name just a few. Further examples of the vehicle subsystems 108 include but are not limited to an advanced driving and safety subsystem (ADAS), a perception sensor subsystem (e.g., providing sensor fusion, enabling radar based control, enabling lidar based control, enabling camera based control, enabling other sensor based control) a steering subsystem (e.g., providing steering control), a body control subsystem (e.g., for controlling cabin environment conditions, for controlling vehicle lights, for controlling vehicle doors and latches, for controlling precipitation wipers, for controlling power and/or climate controlled seating), an active suspension subsystem, a fuel management subsystem, a battery management subsystem (e.g., providing traction energy, managing battery usage and charging control), a power distribution subsystem, subsystem), alarm subsystem, payload subsystem, and extensible-assembly control subsystem (e.g., pod control, exterior tool control), and any other electronic based subsystem of the vehicle 102 that is controllable by the control system 110. In at least one aspect, the control system 110 includes one or more of the subsystems 108 within an enclosure or contained on an assembly of the control system 110. In other words, the subsystems 108 and corresponding edge devices may be internal or external to the control system 110. For example, the control system 110 includes a low voltage power distribution unit as an internal edge device that controls and maintains the integrity of low-voltage or system power connections to edge devices of the vehicle subsystems 108.

As labeled in FIG. 1, the vehicle subsystems 108 are distributed on the vehicle 102 as a vehicle subsystem 108-1 through a vehicle subsystem 108-N, where N is any integer. The vehicle subsystems 108 each include one or more edge devices 112. For example, the vehicle subsystem 108-1 includes an edge device 112-1 and the vehicle subsystem 108-N includes an edge device 112-N. The edge devices 112 and/or the vehicle subsystems 108 are managed within the vehicle system 104 (e.g., centrally located relative the vehicle subsystems 108) by the control system 110. In one or more implementations, the control system 110 includes one or more of the edge devices 112. For example, the edge devices 112 include an on-board I/O expander of the control system 110, a component on a same system on chip as the control system 110, or other variation of the control system 110 that incorporates one or more of the edge devices 112 on a same assembly or within a same enclosure as the control system 110. For example, at least one of the edge devices 112 is internal to the control system 110 and operable to provide I/O control signals and self-arbitrated between being managed by a healthiest control unit of the control system 110.

The control system 110 includes at least two central control units 114 that are labeled in FIG. 1 as a central control unit 114-1 through a central control unit 114-M, where M is any integer greater than one. The control system 110 and the central control units 114 are centrally located on the vehicle 102 relative the edge devices 112 and the vehicle subsystems 108, in at least one example. In at least one other example, the control system 110 is positioned on the vehicle 102 closer to one or more of the edge devices 112 and the vehicle subsystems 108 than others.

The vehicle network 106 is implemented as a wireless or wired network for communicating vehicle data throughout the vehicle system 104. Each of the vehicle subsystems 108 and the central control units 114 share interfaces (e.g., connections) to the vehicle network 106 for exchanging data (e.g., operating data, signals, commands) throughout the vehicle 102. For example, each of the edge devices 112 and the central control units 114 includes a network interface adapter (not shown) that is operable to transmit and receive data via the vehicle network 106. Various types of connections between the vehicle network 106 and the components of the vehicle system 104 are usable on the vehicle 102. For example, the connections to the vehicle network 106 include wired connections including, but not limited to, Ethernet connections or links, memory channels, buses (e.g., a data bus, a system or address bus, a controller area network or CAN bus), interconnects, through silicon vias, traces, pins and sockets, and planes, to name just a few. Other example connections include optical connections, fiber optic connections, and/or connections or links based on quantum entanglement.

The control system 110 is susceptible to faults and errors occurring while the vehicle 102 is driving. These faults and errors occur because of harsh driving environments, vehicle wear, part failure, or other reasons. A fault or error at the control system 110, which is allowed to propagate into the vehicle network 106 as an incorrect command to one or more of the edge devices 112, may cause incorrect vehicle operations, which presents a risk to safety. To reliably control the edge devices 112 in a safe way, even in the presence of faults and errors, the control system 110 includes at least two central control units 114 (e.g., two or more processors). Each of the central control units 114 is configured to redundantly control the edge devices 112 to implement the vehicle operations. For example, the central control unit 114-1 and the central control unit 114-M represent two or more different processors of the control system 110 that are each configured to redundantly control vehicle operations implemented by respective processors of the edge devices 112.

In at least one example, one or more processors of each of the central control units 114 are electronic circuits that process instructions for executing control routines on the vehicle 102. Processor execution of the control routines enables the central control units 114 to manage vehicle operations implemented by the edge devices 112 for causing smooth and safe driving by the vehicle 102. Each of the edge devices 112 likewise includes one or more processors, which are electronic circuits that process instructions for executing subsystem functions on the vehicle 102. Processor execution of the subsystem functions enables the edge devices 112 to implement vehicle operations managed by the central control units 114 for achieving smooth and safe driving by the vehicle 102.

Examples of the processors of the central control units 114 and/or the edge devices 112 include but are not limited to a central processing unit (CPU), a graphics processing unit (GPU), a field programmable gate array (FPGA), an accelerator, an accelerated processing unit (APU), and a system on chip (SoC), a microcontroller, an electronic control unit (ECU), and a digital signal processor (DSP), to name a few. In one or more variations, the processors of the central control units 114 and/or the edge devices 112 include multiple co-processors, multiple cores (e.g., a multi-core processor). In one or more other variations, the processors of the central control units 114 and/or the edge devices 112 include only one core (e.g., a single processor core).

In one or more implementations, the central control units 114 include same hardware technology. For example, the central control unit 114-1 and the central control unit 114-M have identical processor technology. In one or more other implementations, the central control units 114 include different hardware configurations that implement same functionality. For example, a processor of the central control unit 114-1 and the central control unit 114-M have different processor technology configured to execute similar functioning control routines but removes or lessens a possibility of a systemic fault caused by two near-identical hardware implementations failing for similar reasons at approximately the same time due to a latent fault. In one or more implementations, the central control units 114 execute same software, functionally similar software, or deliberately different software to achieve diversity of implementation. For example, the central control units 114 execute different software, which is functionally similar, but removes or lessens a possibility of a systemic fault caused by two near-identical software applications failing in a similar manner, at approximately the same time, due to a latent fault.

The central control units 114 and/or the edge devices 112 further include a memory that stores instructions for execution by the processors to redundantly control the vehicle operations or implement vehicle functions in furtherance of the vehicle operations. For example, the central control units 114 and/or the edge devices 112 each include a memory circuit that stores instructions and data for executing a program (e.g., software, firmware). In one or more implementations, the memory corresponds to semiconductor memory where data is stored within memory cells on one or more integrated circuits. The respective memory of each of the central control units 114 and/or the edge devices 112 is used to store information, such as for immediate output to the vehicle network 106.

In at least one example, the memory of the central control units 114 and/or the edge devices 112 corresponds to or includes volatile memory, examples of which include random-access memory (RAM), dynamic random-access memory (DRAM), synchronous dynamic random-access memory (SDRAM), static random-access memory (SRAM), and memristors. The memory of each of the central control units 114 and/or the edge devices 112 is configurable with any number of memory (e.g., physical memory) without departing from the spirit or scope of the described techniques. Alternatively or in addition, the memory of each of the central control units 114 and/or the edge devices 112 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile random-access memory (NVRAM), such as phase-change memory (PCM) and magneto resistive random-access memory (MRAM). Further examples of memory configurations include low-power double data rate (LPDDR), also known as LPDDR SDRAM. The memory of each of the central control units 114 and/or the edge devices 112 is configurable in a variety of ways capable of supporting vehicle controls.

Each of the processors of the central control units 114 controls the motion and vectoring of the vehicle 102. In other words, the processors of the central control units 114 maintain an operating state of the vehicle 102 (e.g., the vehicle's position and location) to be within a safe operating envelope of the vehicle 102. In such implementations, the processors of the central control units 114 may be configured to redundantly operate the vehicle 102. For example, the processor of the central control unit 114-1 receives the same inputs from the edge devices 112 as the processor of the central control unit 114-M. The processor of the central control unit 114-1 may output the same motion control commands to the edge devices 112 as the processor of the central control unit 114-M. The processor of the central control unit 114-1 and the processor of the central control unit 114-M may perform the same vectoring computations, and so forth. In this way, in the event a first processor of the central control units 114 fails (e.g., the processor of the central control unit 114-1 fails), a second first processor of the central control units 114 (e.g., the processor of the central control unit 114-M) can seamlessly assume control of the vehicle 102.

Due to the redundancy achieved by the control operations executed by each of the central control units 114, the vehicle subsystems 108 follow one set of control operations and treat each redundant set of control operations as a back-up set of commands or signals to follow in case of a failure with the central control unit that generated the first set. Unlike a conventional redundant vehicle control system that relies on a system level arbitrator to switch (e.g., during a failure) from applying one set of control commands over another, the vehicle subsystems 108 (e.g., the edge devices 112) are themselves arbitrators operable to determine whether each of the central control units 114 is reliable.

In accordance with techniques of this disclosure, each of the processors of the central control units 114 is operable to self-report a respective processor health to the vehicle network 106 for enabling each of the edge devices 112 to independently arbitrate to be controlled by a healthiest processor (e.g., a healthiest central control unit). Based on the respective processor health reported for each of the central control units 114, the edge devices 112 are operable to select whether to use commands from one of the central control units 114 or another.

To enable each of the edge devices 112 to select one of the central control units 114 for controlling that vehicle subsystem, each of the central control units 114 outputs health data to the vehicle network 106. For example, the central control unit 114-1 outputs respective health data 118 to the vehicle network 106, and the central control unit 114-M outputs respective health data 120 to the vehicle network 106. The health data 118 and the health data 120 include information to indicate whether failures, errors, faults, or other anomalies are detected in the vehicle system 104, as well as location within the vehicle system 104 of the anomalies. In at least one variation, the health data 118 and the health data 120 indicate overall health of each of the central control units 114. In at least one example, the health data 118 and the health data 120 each indicate overall health of the vehicle system 104, including individual health of each the vehicle subsystems 108 and individual health of each of the central control units 114.

The central control units 114 are operable to self-report health data to each other. For example, the health data 118 is generated by the central control unit 114-1 to include an indication of the health data 120 being self-reported by the central control unit 114-M. The central control units 114 may rely on the health data received from another of the central control units 114 to assess overall health of the vehicle system 104. This way, the health data 118 and the health data 120 are comparable by the edge devices 112 to determine a healthiest central control unit. For example, if the health data 118 output from the central control unit 114-1 misreports health of itself or the vehicle subsystem 108-1, the edge device 112-1 can detect an error in the health data 118 and instead rely on the central control unit 114-M for control commands and signals. As another example, if the health data 118 and the health data 120 conflict in their overall health assessment of the vehicle subsystem 108-1, the edge device 112-1 may suspect a potential fault with the central control unit 114-1 in response to determining that the health data 118 is inaccurate because the health data 120 is consistent with a health assessment made by the edge device 112-1.

As depicted in FIG. 1, the central control units 114 execute health monitors 116 that are each operable to generate health data in response to determining a health of the vehicle subsystems 108 including a self-reported health of that central control unit. For example, a health monitor 116-1 generates the health data 118 being self-reported from the central control unit 114-1 and a health monitor 116-M generates the health data 120 being self-reported from the central control unit 114-M. The health monitors 116 are applications executing on the underlying hardware (e.g., the processors) of the central control units 114. In at least one example, the health monitors 116 represent executable portions of a control routine or control algorithm implemented by the central control units 114. The health monitors 116, in at least one other example, execute as separate execution threads of the control functions implemented by the central control units 114. The health monitors 116 are implemented in any combination of hardware, software, and firmware of the central control units 114.

The health monitors 116 each identify potential failures in the vehicle 102 and account for the self-report health received from one or more counterparts of the central control units 114 to generate an overall health report (e.g., a health score) of the vehicle 102. The central control units 114 each output a respective health score determined by the health monitors 116 to the vehicle network 106 as an indication of the overall health associated with the control system 110 and the vehicle subsystems 108. For example, the health monitor 116-1 writes to memory of the central control unit 114-1 to store the health data 118 from which it is reported to the vehicle network 106. As another example, the health monitor 116-M preserves the health data 120 within a data store or storage unit of the central control unit 114-M where the health data 120 is reportable to the vehicle network 106. With multiple health scores (e.g., the health data 118 and the health data 120) being distributed throughout the vehicle 102, the edge devices 112 on the vehicle network 106 are operable to make a controlling selection automatically based on the self-reported health scores. The edge devices 112 automatically use commands and signals that are received from a healthiest one of the central control units 114 (e.g., a control unit with a highest self-reported health score).

With central control unit arbitration being performed on the edge devices 112 of the vehicle subsystems 108 themselves, there is less likelihood of the vehicle 102 continuing to be controlled by a faulty central control unit (e.g., one of the central control units 114 that is experiencing a fault or reporting errors). An unhealthy one of the central control units 114 is quickly identifiable on the vehicle network 106 based on evaluations of the health data 118 and the health data 120, without waiting for a central arbitrator to detect a failure condition and/or engage control unit switch-over procedures, as is done in a conventional redundant central control system. This distribution of the health data 118 and 120 enables each of the vehicle subsystems 108 to individually maintain safety of their own subsystem functions, which helps ensure the vehicle subsystems 108 continuously operate according to correct (e.g., safe) control commands and signals because no central control system arbitrator exists as a potential single point of failure. This way, if one of the central control units 114 fails, commands, and signals from another of the central control units 114 is still available to the vehicle subsystems 108 to control the vehicle 102 seamlessly and continuously through a failure, e.g., in furtherance of satisfying safety rules such as those defined by ASIL-D.

Figure 2:
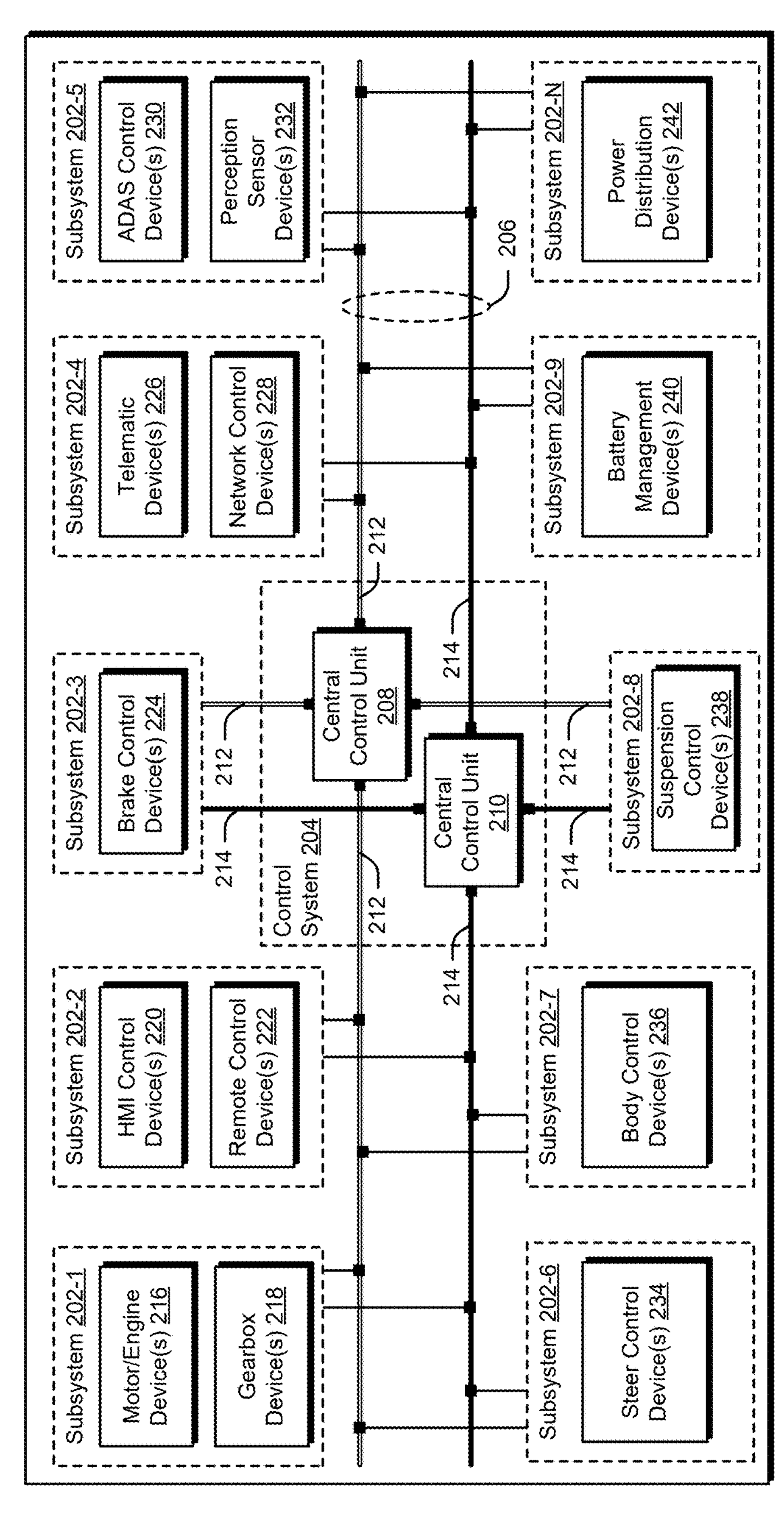
FIG. 2 is a block diagram of a non-limiting example of a vehicle system that implements safe operation of vehicle controllers.

FIG. 2 is a block diagram of a non-limiting example of a vehicle system 200 that implements safe operation of vehicle controllers. For ease of description, the vehicle system 200 is described in the context of the environment 100 shown in FIG. 1 including with reference to similar labeled elements. For example, the vehicle system 200 is a more-detailed version of the vehicle system 104 installed in the vehicle 102. The vehicle system 200 includes a plurality of subsystems 202 (labeled individually as subsystem 202-1 through subsystem 202-N, where N is any integer) that are managed by a control system 204 to implement various vehicle functions. In at least one example, the vehicle system 200 includes additional or fewer subsystems 202 than those depicted in FIG. 2.

The control system 204 is an example of the control system 110 depicted in FIG. 1. The control system 204 is configured as a centralized controller that enables information to transfer between the subsystems 202 over a network 206 (e.g., a vehicle network such as the vehicle network 106). By exchanging information with the subsystems 202, the control system 204 causes the subsystems 202 to execute subsystem functions that enable driving. For instance, the control system 204 receives signals output on the network 206 from one of the subsystems 202, and based on information inferred from the signals, the control system 204 outputs additional signals on the network 206 to cause a particular behavior of another of the subsystems 202.

The control system 204 includes a central control unit 208 and a central control unit 210. The central control unit 208 and the central control unit 210 represent separate processors, processor cores, control units, microcontrollers, system on chips, or other processor technology. Each of the central control unit 208 and the central control unit 210 are configured to execute instructions either as software or firmware to implement functionality of the control system 204. Although not shown, in some examples, the control system 204 includes a non-transitory computer-readable storage medium (e.g., data store, cache, static memory, dynamic memory, flash memory, disk storage) that maintains the instructions and data for implementing the instructions executed by each of the central control unit 208 and the central control unit 210. For example, the central control unit 208 and the central control unit 210 include respective data stores that contain the instructions retrieved from the data stores and executed during operation of the vehicle 102.

In another implementation, the control system 204 is distributed throughout the vehicle system 200 in two or more locations. In such a distributed implementation, the central control unit 208 is included in a first part of the control system 204 arranged at one part of the vehicle 102 (e.g., a front portion) and the central control unit 210 is included in a second part of the control system 204 positioned at another part of the vehicle 102 (e.g., a rear portion). In other distributed implementations, each part of the control system 204 includes one or more multiple instances of the central control unit 208 and/or the central control unit 210.

In one or more examples, the central control unit 208 and the central control unit 210 are functionally redundant. For example, the processors of each of the central control unit 208 and the central control unit 210 are operable to concurrently receive a same set of inputs from the subsystems 202 (e.g., the edge devices 112 of the vehicle subsystems 108) and concurrently send a same set of outputs to the subsystems 202 (e.g., the edge devices 112 of the vehicle subsystems 108). In a similar way, the processors of each of the central control unit 208 and the central control unit 210 are operable to concurrently receive the same set of inputs from the subsystems 202 (e.g., the edge devices 112 of the vehicle subsystems 108) and concurrently send the same set of outputs to the subsystems 202 (e.g., the edge devices 112 of the vehicle subsystems 108) regardless of whether that processor is the healthiest processor.

The subsystems 202 of the vehicle system 200 rely on equivalent control operations of either the central control unit 208 or the central control unit 210 (e.g., one at a time) to actively cause vehicle operations or vehicle functions to be performed by the subsystems 202. For example, while the central control unit 208 is orchestrating operations of the subsystems 202, the central control unit 210 is maintained in a ready, standby state. If the central control unit 208 fails, then the control system 204 activates the central control unit 210 to take over and manage the subsystems 202 where the central control unit 208 left off. When the central control unit 210 takes over, the vehicle 102 may be forced to operate in a safe state, which can include maneuvering away from other vehicles, objects, and pedestrians to come to a controlled stop. This way, the functional redundancy implemented by the central control unit 208 and the central control unit 210 help the control system 204 to satisfy the ASIL-D requirements for reliability and safety. In such implementations, the central control unit 208 and the central control unit 210 may be located at different locations within the vehicle.

The network 206 is an example of the vehicle network 106, and represents any suitable vehicle network technology, including wired and wireless signal propagation mediums. The network 206 enables real-time data exchange, safety enhancements, and efficient traffic management among the components of the vehicle system 200. The network 206 can include various switches, routers, transceivers, controllers, chokes, filters, terminations, and other networking equipment beyond transmission lines, cables, wires, busses, and other signal routing technologies. In an aspect, the network 206 adheres to an in-vehicle networking protocol. For example, the network 206 represents a combination of one or more of a controller area network (CAN), an automotive ethernet network (AEN), serializer/deserializer (SerDes) network, local interconnect network (LIN), or a FlexRay network (FRN).

In at least one example, to implement the redundancy of the control system 204, the network 206 is composed of dual physical network paths or network channels. In at least one example, the central control unit 208 and the central control unit 210 are operable to concurrently exchange a same set of inputs and outputs with the subsystems 202 (e.g., the edge devices 112 of the vehicle subsystems 108) over different and/or same respective channels (e.g., logical or physical channels) of the network 206 that link the subsystems 202 (e.g., the edge devices 112 of the vehicle subsystems 108) to that central control unit (e.g., processor). A network channel 212 or network path communicatively couples each of the subsystems 202 to the central control unit 208. A separate network channel 214 or network path communicatively links each of the subsystems 202 to the central control unit 210. For example, the network channel 212 is utilized by the central control unit 208 to exchange data over the network 206, and the network channel 214 is utilized by the central control unit 210 to exchange data over the network 206. In at least one implementation, if a failure at the central control units 208 is at least partially caused by a fault in the network channel 212, the central control unit 210 is unaffected by the network fault and operable to communicate with the subsystems 202 using the network channel 214. The functional redundancy implemented by the network channel 212 and the network channel 214 further helps the control system 204 to satisfy the ASIL-D requirements for reliability and safety.

In at least one other example, to implement the redundancy of the control system 204, the network 206 is composed of dual logical network paths or channels. The network channel 212 and the network channel 214 may be separate logical paths through the network 206 that communicatively link each of the subsystems 202 to the central control unit 208 and the central control unit 210 using the same physical wires. In at least one example, the central control unit 208 and the central control unit 210 are operable to interleave a same set of inputs and outputs concurrently exchanged with the subsystems 202 (e.g., the edge devices 112 of the vehicle subsystems 108) over a same set of channels (e.g., logical or physical channels) of the network 206 that link the subsystems 202 (e.g., the edge devices 112 of the vehicle subsystems 108) to that central control unit (e.g., processor). For example, communications to and from the central control unit 208 and the central control unit 210 are interleaved on a single set of wires that make up the network 206. If a failure at the central control unit 210 and/or the network channel 214 occurs, communications from the central control unit 208 can reach the subsystems 202 using the network channel 212. The functional redundancy implemented by interleaving the network channel 212 and the network channel 214 further helps the control system 204 to satisfy the ASIL-D requirements for reliability and safety.

The subsystems 202 are each examples of the vehicle subsystems 108, and include one or more edge devices (e.g., the edge devices 112) operatively coupled to the network 206 to provide information to the control system 204 and receive commands from the control system 204 to implement various vehicle functions. For example, each of the subsystems 202 can include one or more actuators, microcontrollers, machines, or other equipment to perform specific vehicle tasks at the discretion of the edge devices that are contained within the subsystems 202.

A subsystem 202-1 is a propulsion or drive subsystem. Motor/engine devices 216 of the subsystem 202-1 represent edge devices managed by the control system 204 to command vehicle propulsion units (e.g., an engine, a motor) to execute driving functions of the vehicle 102 (e.g., forward motion, reverse motion, acceleration, deceleration). In one or more examples, the motor/engine devices 216 manages operations of an engine of the vehicle 102, including fuel injection, ignition timing, emissions control, and engine health monitoring. In at least one aspect (e.g., in context of electric vehicles), the motor/engine devices 216 control inverters and motors that convert electric energy into mechanical energy for applying torque to wheels.

In addition, the subsystem 202-1 includes gearbox devices 218. Also referred to as a powertrain control module (PCM) and/or a transmission control module (TCM), transmission and gearbox functions are overseen by the gearbox devices 218 to implement an automatic transmission, optimize gear changes (e.g., gear shifts), and control torque delivered to the wheels of the vehicle 102. A vehicle may include one or more instances of the subsystem 202-1 (e.g., one subsystem 202-1 for each axle).

A subsystem 202-2 is a human machine interface (HMI) subsystem. The subsystem 202-2 includes one or more HMI control devices 220 that implement a vehicle user interface. The vehicle user interface enables interaction between occupants (e.g., driver, passenger) of the vehicle 102 and the vehicle system 200, which enables human intervention in vehicle functions and driving. For example, the HMI control devices 220 control vehicle displays, vehicle dash clusters, head-up display units, haptic feedback, audible feedback, and other visual driving aids interpreted by the occupants to help with driving or ensuring safe vehicle operations. In one or more implementations, the HMI control devices 220 provide a human-interface to effect climate controls (e.g., heating, cooling), cabin features (e.g., infotainment, lighting), and other vehicle body features (e.g., windshield wipers, transmission settings, suspension settings, drive mode selection, power seating, power mirrors, power door locks).

The subsystem 202-2 also includes one or more remote control devices 222 that allow human or machine inputs to control the vehicle 102 from outside the cabin. For example, in an autonomous or semi-autonomous vehicle context, the remote control devices 222 receive commands over a communication link with a base station (e.g., a mobile phone, a key fob, a remote computing system) to allow a human or machine operator to control the vehicle 102 as if the driving commands are provided directly to the HMI control devices 220. In hot or cold weather, to pre-cool or pre-heat the cabin, the remote control devices 222 activate remote starting functions. The remote control devices 222 in at least one aspect allow door locks to be unlocked or locked and doors, tailgates, or trunks to be remotely opened or closed.

A subsystem 202-3 represents a braking subsystem of the vehicle system 200. For example, one or more brake control devices 224 are operable to manage anti-lock braking systems (ABS), electronic stability controls (ESC), and otherwise convert driver inputs at the HMI control devices 220 to effect performance of vehicle brakes (e.g., for stopping, for decelerating). In some examples, the brake control devices 224 represent a braking control module (BCM).

Another of the subsystems 202 depicted in FIG. 2 includes a subsystem 202-4, which is an onboard-vehicle communication subsystem. The subsystem 202-4 manages telematics and communications that occur within the vehicle 102, and with other devices located outside the vehicle 102. For example, the subsystem 202-4 interfaces with the various edge devices coupled to the network 206 to ensure healthy exchange of data that is free of errors or faults. In addition, the subsystem 202-4 interfaces with other vehicles, mobile devices, infrastructure, and remote computing systems to implement various vehicle functions. One or more network control devices 228 of the subsystem 202-4 monitor network health of the network 206 and facilitate communication protocols implemented therein. The network control devices 228 are configured to diagnose problems with the network 206 to reroute signals and prevent data loss.

One or more telematic devices 226 of the subsystem 202-4 handle offboard communications of the vehicle 102. This includes implementing vehicle-to-vehicle (V2V) and vehicle-to-everything (V2X) communications that enable the vehicle 102 to communicate with other intelligent vehicles and systems in an operating environment (e.g., on or near a roadway). The telematic devices 226 interface with over-the-air (OTA) update services to update software on the vehicle 102. In addition, the telematic devices 226 interface with a positioning system to assist with navigation functions. Other features implemented by the telematic devices 226 include remote diagnostics, remote observation of environment via sensors such as cameras, radar or LIDAR, remote operations such as driving, and interfacing with emergency response services (e.g., to automatically alert emergency responders in the event of an accident).

A subsystem 202-5 is an advanced driving and safety (ADAS) subsystem of the vehicle system 200. The subsystem 202-5 has two main functions, including implementing an ADAS as well as a perception sensor system. For example, one or more ADAS control devices 230 implement ADAS functionality that includes autonomous or semi-autonomous control, adaptive cruise control, emergency braking, lane centering, and other ADAS functions. One or more perception sensor devices 232 support the ADAS control devices 230 by providing information about the driving environment to ensure safe driving. For example, a radar, a camera, a lidar, an ultrasonic sensor, a global position system (GPS) sensor, an inertial measurement unit (IMU), and other sensor technology is deployed by the perception sensor devices 232 to collect sensor data about a vehicle environment. Sensor fusion techniques, object detection, lane centering, path trajectory planning, and other perception sensor functions are executed by the perception sensor devices 232 to enable the ADAS functions performed by the ADAS control devices 230.

A subsystem 202-6 is a steering subsystem that controls elements of the vehicle, which steer the wheels. One or more steer control devices 234 integrate with an electric power steering system of the vehicle 102 to control direction of the vehicle wheels. The steer control devices 234 receive inputs from the HMI control devices 220 and/or the control system 204, which are translated into appropriate steering commands for controlling steering actuators that change the direction of the wheels for steering and performing evasive maneuvers.

A subsystem 202-7 represents a body control subsystem of the vehicle 102. Included in the subsystem 202-7 are one or more body control devices 236, which oversee functions related to vehicle body controls. For example, window actuators, door locks and latches, interior and exterior lighting, tailgate and trunk latches, and the like are controlled by the body control devices 236 at the command of the control system 204 and/or one or more of the other subsystems 202 (e.g., the HMI control devices 220).

A subsystem 202-8 is an active suspension control subsystem. One or more suspension control devices 238 implement functions of a suspension control module (SCM) to regulate suspension components to adjust a ride level of the vehicle 102. For example, the suspension control devices 238 configure a vehicle suspension to be stiffer on paved surfaces for improved driving performance and maneuverability. In an offroad setting, the suspension control devices 238 enable a softer suspension setting to provide a smoother ride.

A subsystem 202-9 represents a battery management subsystem of the vehicle 102. One or more battery management devices 240 monitor and manage the continuity of energy supply and performance of a battery pack (also referred to as a traction battery) to ensure appropriate energy supply and charging and discharging rates to promote longevity and overall battery health. The battery management devices 240 control charging operations of on board vehicle batteries as well as controlling battery usage (e.g., to control a rate of discharge). The battery management devices 240 monitor health of vehicle batteries to alert the control system 204 when a malfunction is imminent or occurring.

Finally, a subsystem 202-N is depicted in FIG. 2, which represents a power distribution system. One or more power distribution devices 242 of the subsystem 202-N manage the distribution of electrical power from energy sources on the vehicle 102 to the vehicle system 200. For example, the power distribution devices 242 control power switches, inverters, converters, and other electrical distribution components to ensure the subsystems 202 receive an appropriate level of current and voltage for implementing vehicle functions. The power distribution devices 242 can include fault protection circuits and breakers to interrupt power to a faulty subsystem and maintain safe electrical conditions while the vehicle 102 remains active. The power distribution devices 242 interface with the motor/engine devices 216 and the battery management devices 240 to manage safe electrical conditions throughout the vehicle system 200.

Figure 3:
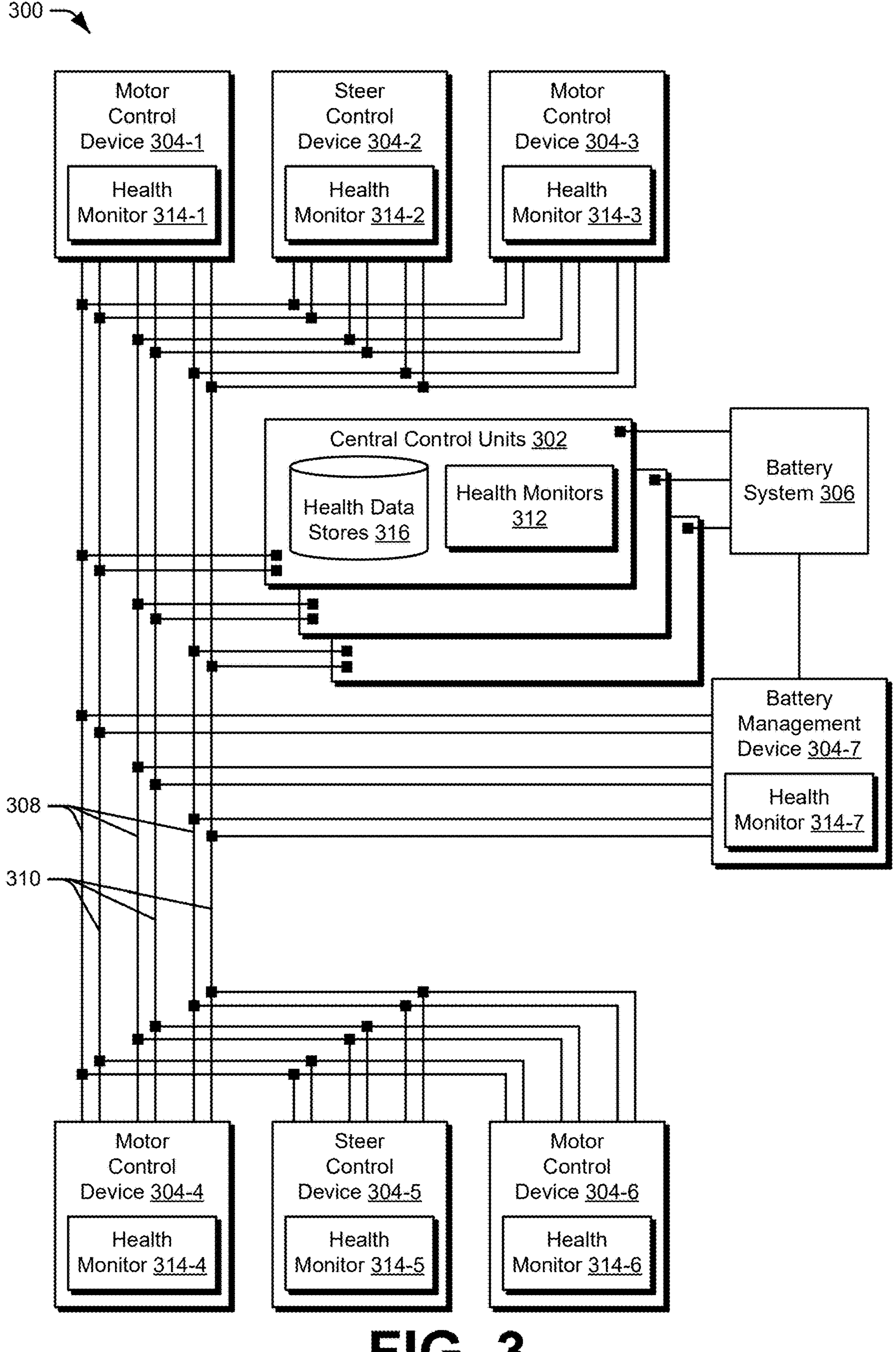
FIG. 3 is a block diagram of a non-limiting example of a vehicle system that implements safe operation of vehicle controllers.

FIG. 3 is a block diagram of a non-limiting example of a vehicle system 300 that implements safe operation of vehicle controllers. For ease of description, the vehicle system 300 is described in the context of the environment 100 of FIG. 1 and/or the vehicle system 200 of FIG. 2, including with reference to similar labeled elements.

The vehicle system 300 has multiple processors configured to redundantly control steering and motion operations of a vehicle (e.g., the vehicle 102) including to redundantly manage power being distributed throughout the vehicle system 300 to enable these operations. For example, the vehicle system 300 includes a group of three central control units 302 with each being an example of one of the central control units 114, the central control unit 208, and the central control unit 210.

Each of the central control units 302 is configured to manage a same group of edge devices 304 that implement the vehicle operations. The edge devices 304 are examples of the edge devices 112, as well as the vehicle subsystems 108 and the subsystems 202. For example, the edge devices 304 include a motor control device 304-1, a steer control device 304-2, and a motor control device 304-3, which represent a vehicle front-end steering and motion subsystem. In addition, the edge devices 304 include a motor control device 304-4, a steer control device 304-5, and a motor control device 304-6, which represent a vehicle rear-end steering and motion subsystem. The edge devices 304 further include a battery management device 304-7 controlled by each of the central control units 302 to deliver electrical power from a battery system 306 of the vehicle system 300.

The central control units 302 communicate over network channels 308 to exchange control signals and subsystem data with the edge devices 304. In this way, the central control units 302 redundantly control each of the edge devices 304 based on communications exchanged over the network channels 308. To distribute power from the battery system 306 in furtherance of managing the edge devices 304, the central control units 302 output electrical energy to the edge devices 304 over different respective connections 310. This enables the central control units 302 to redundantly supply power over the connections 310 from the battery system 306 to each of the edge devices 304. Accordingly, in one or more implementations, three sets of control signals, and three sets of electrical supply signals, are output from the central control units 302 such that each of the edge devices 304 remains operable and powered, even if two out of three of the central control units 302 fails.

The central control units 302 execute respective health monitors 312, which are examples of the health monitors 116. In addition, the edge devices 304 each execute respective health monitors 314, which are labeled in FIG. 3 as health monitor 314-1 through health monitor 314-7. The health monitors 312 and the health monitors 314 coordinate to enable a system-level switch-over process that automatically and continuously singles out one of the central control units 302 for controlling the vehicle system 300 at a given time.

For example, the health monitors 312 configure each of the central control units 302 to self-report a respective processor health and an overall system health maintained in respective health data stores 316. The health monitors 312 write self-reported processor heath data to the health data stores 316. In one or more implementations, the heath data stores 316 maintain a record of individual health scores attributed to specific components or parts of the vehicle system 300. For example, each of the health data stores 316 maintains an indication (e.g., a health score) of overall health of the vehicle system 300, including indications of health for each of the central control units 302, each of the edge devices 304, the battery system 306, and other components of the vehicle system 300. Each of the heath monitors 312 is operable to derive a health score associated with a corresponding one of the central control units 302. In one example, a healthy score has a high value (e.g., 90%, greater than zero, a bitfield or numerical array with higher weighted score) and an unhealthy score has a low value (e.g., 60%, less than zero, a bitfield or numerical array with lower weighted score). The health data maintained at the health data stores 316 is output over the network channels 308 and received by the health monitors 314.

Based on the health data received from the central control units 302, the health monitors 314 configure each of the edge devices 304 to self-arbitrate and decide to be controlled by one of the central control units 302. In some examples, based on the health data received from the central control units 302, the health monitors 314 configure each of the edge devices 304 to self-arbitrate and decided to be managed by one of the central control units 302 (e.g., a healthiest processor). For example, imagine that the network channels 308 experience a failure and the motor control device 304-4 loses communication with a first processor of the central control units 302 as the motor control device 304-1 is relying on the first processor to be controlled. The health monitor 314-4 may receive health data from a second or third processor of the central control units 302 via one or more of the network channels 308 that remains operational during the failure. Based on the health data output from the health data stores 316 of the second and third processors, and/or the lack of health data seemingly being propagated by the first processor, the health monitor 314-4 may determine that the fault is limited to the communication with the first processor. In response to recognizing the fault, the health monitor 314-4 may cause the motor control device 304-4 to switch to being controlled by the second or third processor of the central control units 302. Similar operations may occur if power distributed from the first processor of the central control units 302 is corrupted or insufficient for enabling functions on the motor control device 304-4. In response to recognizing a faulty power supply output from the first processor, the health monitor 314-4 may cause the motor control device 304-4 to switch to being controlled by the second or third processor of the central control units 302.

In one or more examples, the health monitors 312 are each operable to concurrently determine a presence of one or more faults attributed to the edge devices 304 and determine the respective processor health of that processor based on the presence of the faults. For example, the health monitors 312 receive health data from the edge devices 304, such as health data that is output from the health monitors 314 through the network channels 308. Based on information received from the health monitors 314, the health monitors 312 determine whether faults, errors, or other health anomalies are apparent with the edge devices 304. For example, each of the heath monitors 312 is operable to derive a health score associated with each of the edge devices 304. In one example, a health score of an edge device that is healthy has a high value (e.g., 100%) and an unhealthy edge device is assigned a health score that has a low value (e.g., 40%).

In at least one implementation, the health monitors 312 cause the central control units 302 to initiate a safe termination of the vehicle operations in response to determining the respective processor health being self-reported by at least one of the central control units 302 or at least one of the edge devices 304 does not satisfy a safety threshold. Each of the central control units 302 may concurrently attempt to mitigate the faults that cause the low health scores, which are outside the safety threshold. In at least one implementation, each of the central control units 302 determine the respective processor health of that processor based on whether the faults are mitigated. For example, the health monitors 312 may increase the health scores of the central control units 302 and/or the vehicle system 300 when the faults are eliminated. If, however, the faults remain and the health scores generated by the health monitors 312 remain below the safety threshold, the central control units 302 may cause the vehicle 102 to cease operating or perform a safety maneuver for parking in a location that is away from traffic.

Figure 4:
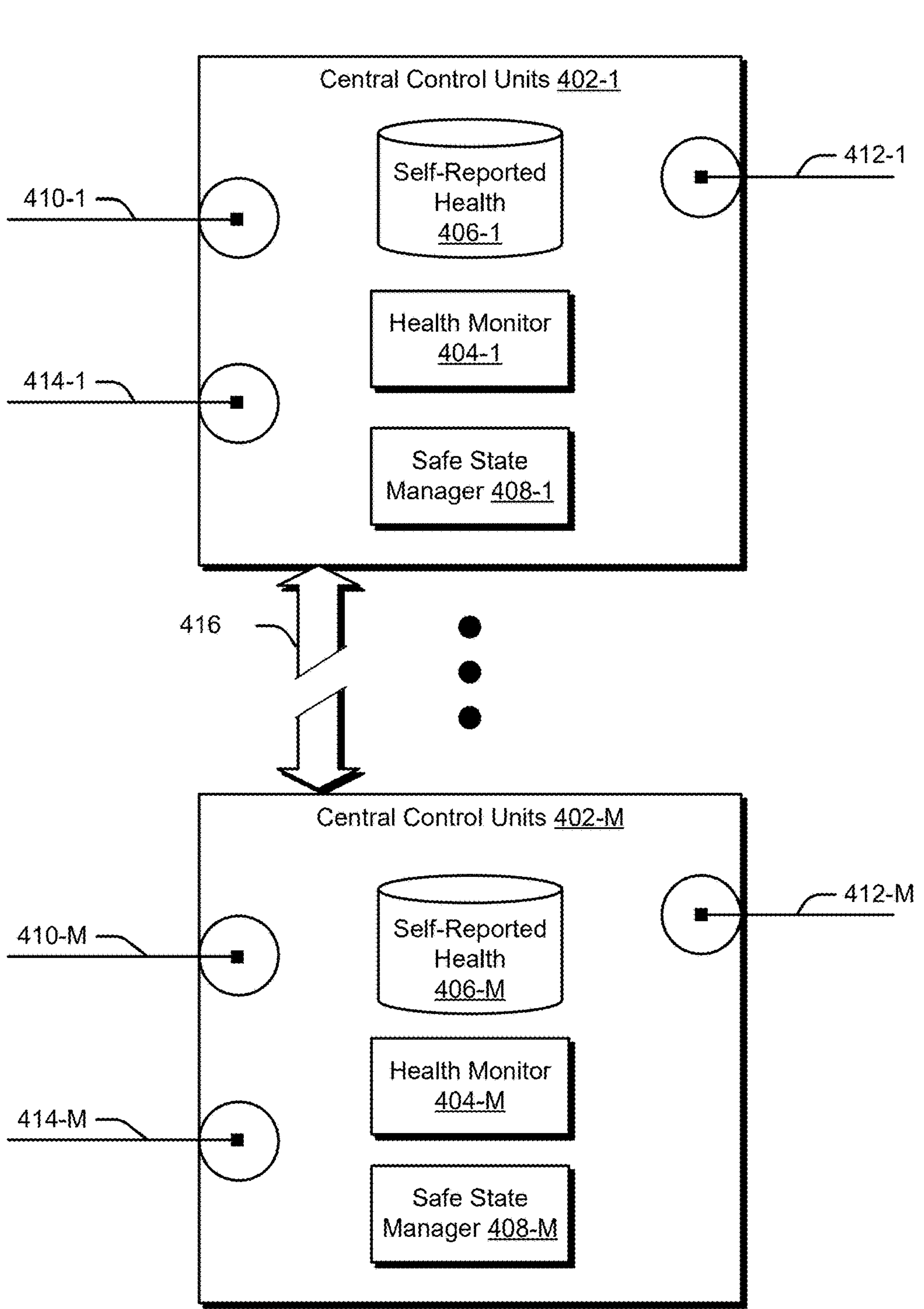
FIG. 4 is a block diagram of a non-limiting example of a vehicle control system that implements safe operation of vehicle controllers.

FIG. 4 is a block diagram of a non-limiting example of a vehicle system 400 that implements safe operation of vehicle controllers. The vehicle system 400 includes a plurality of central control units 402, which are individually labeled as a central control unit 402-1 through a central control unit 402-M. The central control units 402 are examples of the control units 114, the control units 114, and the central control units 302.

Each of the central control units 402 implements a health monitor configured to generate self-reported health that enables a safe state manager of each to determine whether an underlying vehicle is operating under acceptable conditions for achieving safe driving. For example, the central control unit 402-1 includes a health monitor 404-1 that maintains a self-reported health 406-1, which enables a safe state manager 408-1 to safely control an underlying vehicle. Likewise, the central control unit 402-M includes a health monitor 404-M that maintains a self-reported health 406-M, which enables a safe state manager 408-M to safely control an underlying vehicle.

Each of the central control units 402 is operable to concurrently receive a respected device health being self-reported by each of the edge devices of the vehicle system 400 for independently controlling one or more of the vehicle operations implemented by that edge device. For example, to communicate with edge devices of the vehicle system 400, each of the central control units 402 interfaces with a respective network channel. The central control unit 402-1 includes an interface to a network channel 410-1 to send and receive information from edge devices for deriving system health data and for controlling vehicle operations. The central control unit 402-M likewise includes an interface to a network channel 410-M to exchange information with the edge devices. The health monitor 404-1 and the health monitor 404-M independently and concurrently receive edge health data reported to the central control units 402 over the network channel 410-1 and the network channel 410-M. In one or more examples, each of the central control units 402 is operable to disable at least one of the edge devices based on the respective device health being self-reported by the at least one of the edge devices. For example, the central control unit 402-1 disables the edge device 112-1 based on the device health data received over the network channel 410-1 to prevent the central control unit 402-M from continuing to operate the vehicle 102 using faulty equipment (e.g., a faulty edge device). The device health data or edge health data received by the central control units 402 may further enable each of the central control units 402 to derive a respective system health for that central control unit, which accounts for health of the edge devices in addition to that of itself. By outputting the respective system health derived by the central control unit 402-1 over the network channel 410-1 at the same time the respective system health derived by the central control unit 402-M is output over the network channel 410-M, each edge device managed by the central control units 402 is operable to independently determine the healthiest processor among the central control units 402 for implementing edge device functions.

Each of the central control units 402 is operable to redundantly supply electrical power to each of the edge devices of the vehicle system 400. For example, to supply power to edge devices of the vehicle system 400, each of the central control units 402 electrically couples and manages a respective connection to the edge devices with a respective connection to a power supply. In at least one implementation, the vehicle system 400 includes an edge device configured as a low voltage power distribution unit that controls and maintains the integrity of low voltage power supplied to one or more of the edge devices (e.g., one or more of the edge devices 112). The low voltage power distribution unit is managed by each of the central control units 402 and the low voltage power distribution unit self-arbitrates whether to be managed by each of the central control units 402 based on processor health data being self-reported by the central control units 402. The central control unit 402-1 includes an interface to a connection 412-1 to receive electrical energy from a power source. The central control unit 402-1 further includes a connection 414-1 to the edge devices of the vehicle system 400 for distributing edge device power derived from the electrical energy received at the connection 412-1. The central control unit 402-M includes an interface to a connection 412-M to receive electrical energy from the power source. The central control unit 402-M further includes a connection 414-M to the edge devices of the vehicle system 400 for distributing edge device power derived from the electrical energy received at the connection 412-M. This enables each of the central control units 402 to manage power distributed to each edge device of the vehicle system 400, and further enables the central control units 402 to redundantly supply power to the edge devices in case one or more of the central control units 402 fails.

In one or more examples, the vehicle system 400 includes a processor side channel 416 configured to communicate the respective processor health being self-reported by each of the central control units 402 to each other central control unit of the vehicle system 400. In at least one example, the processor side channel 416 is separate from a vehicle network (e.g., separate from the network channel 410-1 through the network channel 410-M). In another example, the processor side channel 416 is implemented on the vehicle network (e.g., in conjunction with the network channel 410-1 through the network channel 410-M).

For example, the central control unit 402-1 is operable using the health monitor 404-1 to self-report the respective processor health of that processor to the central control unit 402-M by outputting the self-reported health 406-1 over the processor side channel 416. The central control unit 402-M receives the self-reported health 406-1 from the processor side channel 416. The health monitor 404-M can use the self-reported health 406-1 to derive the self-reported health 406-M. Likewise, the central control unit 402-M can output the self-reported health 406-M over the processor side channel 416 to enable the health monitor 404-1 to consider the health of the central control unit 402 in deriving the self-reported health 406-1.

In one or more implementations, each of the central control units 402 is operable to disable itself based on the respective processor health being self-reported by that other processor. For example, the safe state manager 408-1 is configured to cause the vehicle system 400 to operate in a safety state (e.g., an perform a safety maneuver) when the self-reported health 406-1 output to the processor side channel 416 indicates a failure. The health monitor 404-1 may update the self-reported health 406-1 based on the self-reported health 406-1, which causes the safe state manager 408-1 to cause an underlying vehicle to enter a safety operating state.

Figure 5:
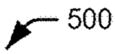
FIG. 5 depicts a procedure for implementing safe operation of vehicle controllers.
Figure 5:
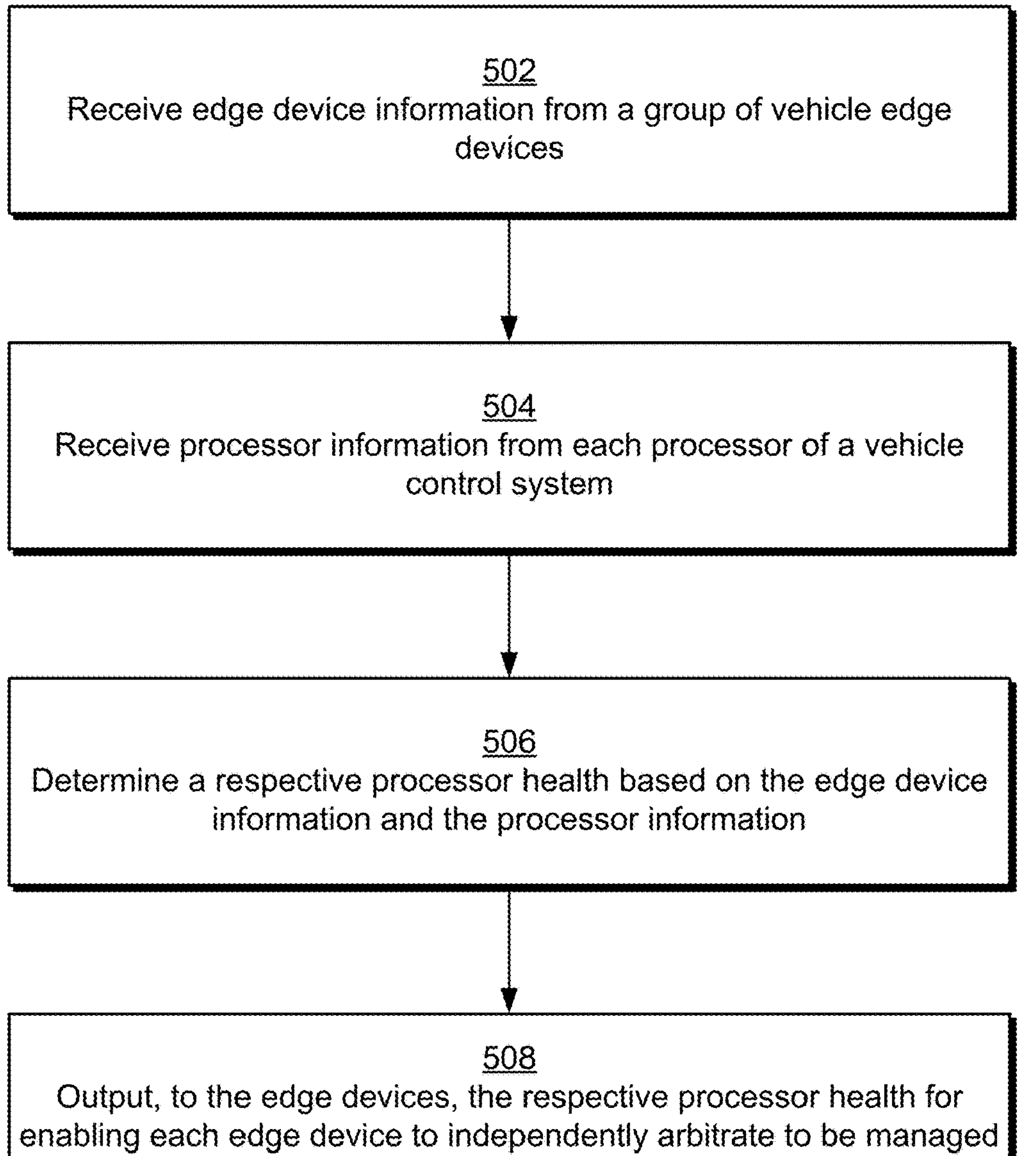

FIG. 5 depicts a procedure 500 for implementing safe operation of vehicle controllers. The procedure 500 includes multiple operations illustrated as block 502 through block 508 and provides just one example procedure performed within any of the previously described systems (e.g., the vehicle system 104, the vehicle system 200, the vehicle system 300, the vehicle system 400). The procedure 500 is not limited to the order of operations shown in FIG. 5, other orderings of the block 502 through the block 508 are possible. In one or more implementations, the procedure 500 includes additional or fewer operations than those depicted in FIG. 5.

The procedure 500 starts with edge device information being received from a group of vehicle edge devices (block 502). For example, the central control units 114 each receive information from the edge devices 112, which enables the central control units 114 to redundantly control operations of the vehicle 102 being implemented by the vehicle subsystems 108.

Next, processor information is received from each processor of a vehicle control system (block 504). For example, the central control units 114 exchange self-reported processor health information with each other to configure each of the central control units 114 to redundantly manage the other central control units 114 in furtherance of maintaining a safe operating state on the vehicle 102. The processor health information can be exchanged over the processor side channel 416, for example.

A respective processor health is determined based on the edge device information and the processor information (block 506). For example, each of the health monitors 116 derives a respective health score associated with a corresponding one of the central control units 114 and/or an overall system-level health score associated with the vehicle system 104.

The respective processor health is output to the edge devices for enabling each edge device to independently arbitrate to be managed by the healthiest processor of the vehicle control system (block 508). For example, the central control units 114 send an indication of the respective health data generated by the health monitors 116 to the vehicle network 106 as the health data 118 and the health data 120. Based on the health data 118 and the health data 120, the edge devices 112 are operable to independently arbitrate and decide to be controlled by a healthiest processor of either the central control unit 114-1 or the central control unit 114-M.

Many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the edge devices 112, the central control units 114, the health monitors 116, the subsystems 202, the control system 204, the central control units 302, the edge devices 304, the health monitors 312, the health monitors 314, the central control units 402, the health monitors 404, the safe state managers 408) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a DSP, a GPU, a parallel accelerated processor, a plurality of microprocessors, one or more microprocessors in association with a DSP core, a controller, a microcontroller, Application Specific Integrated Circuits (ASICs), FPGAs, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a ROM, a RAM, a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:

a vehicle network;

a plurality of edge devices in communication with the vehicle network and operable to implement vehicle operations; and a vehicle control system in communication with the vehicle network and having at least two processors configured to redundantly control the vehicle operations implemented by the edge devices, each of the processors executes as a continuously operating unit with executive control of the system and self-reports a respective processor health to the vehicle network, and each edge device independently arbitrates control to a healthiest processor that the edge device independently determines based on the respective processor health of each of the processors.

2. The system of claim 1, wherein each of the processors is operable to concurrently receive a same set of inputs from the edge devices and concurrently send a same set of outputs to the edge devices.

3. The system of claim 2, wherein each of the processors is operable to concurrently receive the same set of inputs and concurrently send the same set of outputs regardless of whether that processor is the healthiest processor.

4. The system of claim 1, wherein each of the processors is operable to concurrently exchange a same set of inputs and outputs with the edge devices over respective channels of the vehicle network that link the edge devices to that processor.

5. The system of claim 1, wherein the processors are operable to interleave a same set of inputs and outputs concurrently exchanged with the edge devices over a same set of channels of the vehicle network.

6. The system of claim 1, wherein each of the processors is operable to:

self-report the respective processor health of that processor to each other processor of the vehicle control system for controlling the vehicle operations by communicating, on a processor side channel that is separate from the vehicle network, the respective processor health to each other processor of the vehicle control system.

7. The system of claim 1, wherein each of the processors is operable to concurrently receive a respective device health being self-reported by each of the edge devices for independently controlling one or more of the vehicle operations implemented by that edge device.

8. The system of claim 7, wherein each of the processors is operable to disable at least one of the edge devices based on the respective device health being self-reported by the at least one of the edge devices.

9. The system of claim 1, wherein the respective processor health being self-reported by each of the processors comprises a respective system health determined by that processor for further enabling each edge device to independently determine the healthiest processor.

10. The system of claim 1, wherein at least one of the edge devices automatically uses commands and signals that are received from the healthiest processor.

11. The system of claim 1, wherein the at least one of the edge devices automatically switches between using first commands and signals from a first healthiest processor to using second commands and signals from a second healthiest processor determined based on respective subsequent health of each of the processors.

12. A vehicle control system comprising:

at least two processors configured to redundantly control vehicle operations by communicating over a vehicle network to independently manage a same group of edge devices that implement the vehicle operations, each of the processors executes as a continuously operating unit with executive control of the vehicle control system and self-reports a respective processor health to the vehicle network, and each edge device independently arbitrates control to a healthiest processor that the edge device independently determines based on the respective processor health of each of the processors.

13. The vehicle control system of claim 12, wherein each of the processors is operable to concurrently determine a presence of one or more faults attributed to the edge devices and determine the respective processor health of that processor based on the presence of the faults.

14. The vehicle control system of claim 13, wherein each of the processors is operable to concurrently attempt to mitigate the faults and determine the respective processor health of that processor based on whether the faults are mitigated.

15. The vehicle control system of claim 12, wherein each of the processors is operable to:

self-report the respective processor health of that processor to each other processor of the vehicle control system for controlling the vehicle operations;

initiate a safe termination of the vehicle operations in response to determining the respective processor health being self-reported by at least one of the processors does not satisfy a safety threshold; and cause the vehicle to perform a safety maneuver for parking in a location that is away from traffic when faults remain and health scores remain below the safety threshold.

16. The vehicle control system of claim 12, wherein each of the processors is operable to:

concurrently control power distributed to the edge devices over respective connections between the edge devices and that processor; and redundantly supply power over the respective connections from a battery system to each of the edge devices such that each of the edge devices remains operable and powered if at least one of the processors fails.

17. The vehicle control system of claim 12, wherein each of the processors is operable to self-report the respective processor health of that processor to each other processor of the vehicle control system for controlling the vehicle operations by communicating, on a processor side channel that is separate from the vehicle network, the respective processor health to each other processor of the vehicle control system.

18. A non-transitory computer-readable storage medium comprising instructions that, when executed, cause a vehicle control system to redundantly control vehicle operations by independently managing a group of vehicle edge devices using at least two processors, each of the processors executes as a continuously operating unit with executive control of the system and being operable to:

receive edge device information from the edge devices;

receive processor information from the processors;

determine a respective processor health based on the edge device information and the processor information; and self-report, to the edge devices, the respective processor health, and each edge device independently arbitrates control to a healthiest processor that the edge device independently determines based on the respective processor health of each of the processors.

19. The non-transitory computer-readable storage medium of claim 18, wherein the non-transitory computer-readable storage medium is installed in a vehicle.

20. The non-transitory computer-readable storage medium of claim 19, wherein the non-transitory computer-readable storage medium is installed in a vehicle control system of the vehicle.

* * * * *